3,326,855
CONDENSATION POLYMERS FROM TETRA-
HALOBUTANE-1,4-DIOLS
Markus Matzner, Edison Township, and Charles N. Merriam, Martinsville, N.J., assignors to Union Carbide Corporation, a corporation of New York
No Drawing. Filed Mar. 4, 1964, Ser. No. 349,494
7 Claims. (Cl. 260—47)

This invention relates to condensation polymers from tetrahalobutane-1,4-diols and more particularly, to polyesters, polycarbonates and polyurethanes derived from 2,2,3,3-tetrahalobutane-1,4-diols.

Although polycarbonates, polyurethanes and aryl dibasic acid polyesters have found widespread commercial applications, there is a continuing need for improved normally solid polymers possessing higher softening points than those previously available together with self-extinguishing properties, resistance to chemical attack, and low gas permeability. In addition, these polymers should exhibit good film forming fiber forming and molding characteristics. Ideally these improvements should be attained without sacrificing desirable properties of the known polymers, such as tensile strength, crystallinity, and thermal stability.

While the incorporation of halogen into a polymer often imparts self-extinguishing properties to it, the resultant polymer may thus be rendered less thermally stable due to the creation of sites susceptible to dehydrohalogenation.

It is, therefore, an object of the invention to provide normally solid, thermally stable, self-extinguishing polymers having high softening points, good resistance to chemical attack and low gas permeability.

It is a further object to provide polymers exhibiting good film forming, fiber forming and molding characteristics.

It is another object to provide thermally stable, self-extinguishing polymers which can be plasticized with conventional plasticizers.

Other objects of the invention will become apparent to those skilled in the art upon an examination of the detailed explanation below.

It has now been found that novel, normally solid self-extinguishing, thermally stable condensation polymers having high softening points, low gas permeability and good film forming, fiber forming and molding characteristics can be prepared from tetrahalobutane-1,4-diols having the structure

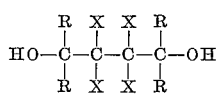

in which R is hydrogen or a lower hydrocarbon group as more particularly set forth below and X is a halogen.

Such tetrahalobutane-1,4-diols as employed herein now provide a useful medium for providing the condensation polymers described in the present invention, which themselves provide a new and important combination of physical properties. A particularly surprising finding was that despite the high halogen content of these polymers that they are unexpectedly thermally stable up to about 200° C. and show no evidence of splitting out hydrogen halide.

Chlorine is the preferred halogen substituent indicated as X for economic reasons, but fluorine, bromine or iodine substituted polyesters can be used too.

The preferred lower alkyl groups of this invention are illustrated by those having up to about 8 carbon atoms as for example, methyl, ethyl, propyl, isopropyl, butyl, isobutyl, t-butyl, pentyl, hexyl, heptyl, 2-ethylhexyl, isooctyl, and octyl groups and the like.

The preferred cycloalkyl groups contain 4 to 6 carbon atoms in the ring, although others can also be used, and may be unsubstituted or substituted by hydrocarbon, halogen and like groups. Examples include, cyclobutyl, 2,2,4,4-tetramethylcyclobutyl, cyclopentyl, cyclohexyl, methylcyclohexyl groups and the like.

Phenyl and substituted phenyl radicals are the preferred aryl radicals although others can be used if desired. Tolyl, zylyl, and ortho, meta, or para chlorophenyl radicals illustrate some of the useful substituted phenyl radicals within the purview of the invention.

The preferred aralkyl radicals are the benzyl and phenylethyl radicals and their substituted derivatives such as ortho, meta- or para-, methyl-, chloro- or cyano-benzyl or phenylethyl radicals.

The polymers of the present invention are characterized as having the repeating unit represented by the structure:

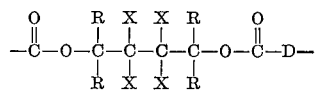

with the number of such repeating units being sufficiently high as to represent a normally solid high polymer. In the above structure, X is a halogen substituent, as defined above with chlorine as the preferred halogen. The divalent radical D of the above structure is at least one of the groups represented by the formula (a)                 —Q—
(b)                 —O—Q—O—
(c) 

in which Q represents a divalent hydrocarbon group, and wherein each of $R_1$ and $R_2$ represents a monovalent lower hydrocarbon group as represented by R above, or together represents a divalent alkylene bridge between the nitrogen atoms when Q is also an alkylene bridge, such as would result from piperazine.

Thus, as is readily seen, the polymers of this invention can be polyesters when D is represented by the structure (a) above or a polycarbonate when D is represented by the structure (b) above or a polyurethane when D is the structure represented by (c) above. It is of course, contemplated that interpolymers are also possible in which different D groups are present in the same polymeric chains, as for example, in a poly(carbonate-urethane).

In this invention, Q can be any divalent hydrocarbon group, even those having as few as one or as many as 25 or more carbon atoms as for example, any of the alkylene radicals and preferably ethylene, tetramethylene, pentamethylene and hexamethylene radicals, as well as cycloalkylene and arylene radicals such as the 1,3-cyclobutylene, 1,3-cyclopentylene, 1,4-cyclohexylene, 2-cyclohexen-1,4-ylene, 2,5-cyclohexadien-1,4-ylene, 1,4-phenylene, 1,8-naphthylene, 2,4-tolylene, 2,5-tolylene and similar groups as well as mixed phenylene bonded groups such as may result from the residues of polynuclear phenols such as those having the general formula

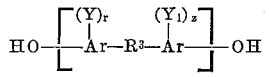

in which event the hydrocarbon Q group represents that residue between the brackets in which Ar is an aromatic divalent hydrocarbon such as phenylene, Y and $Y_1$ which can be the same or different are alkyl radicals, preferably having from 1 to 4 carbon atoms, halogen atoms, i.e., fluorine, chlorine, bromine and iodine, or alkoxy radicals, preferably having from 1 to 4 carbon atoms, $r$ and $z$ are integers having a value from 0 to a maximum value corresponding to the number of hydrogen atoms on the aromatic radical (Ar) which can be replaced by substituents and $R^3$ is a bond between adjacent carbon atoms as in dihydroxy-diphenyl or is a divalent radical including for example

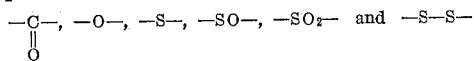

and divalent hydrocarbon radicals such as alkylene, alkylidene, cycloaliphatic e.g., cycloalkylene and cycloalkylidene, halogenated alkoxy or aryloxy substituted alkylene, alkylidene and cycloaliphatic radicals as well as alkarylene and aromatic radicals including halogenated, alkyl, alkoxy or aryloxy substituted aromatic radicals and a ring fused to an Ar group or $R^3$ can be polyalkoxy, or polysiloxy, or two or more alkylidene radicals separated by an aromatic ring, a tertiary amino group, an ether linkage, a carboxyl group or a sulfur containing group such as sulfoxide and the like.

Examples of specific dihydric polynuclear phenols include, among others:

The bis-(hydroxyphenyl)-alkanes such as 2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-(p-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)ethane,
1,3-bis(3-methyl-4-hydroxyphenyl)propane,
2,2-bis(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxynapthyl)propane,
2,2-bis-(4-hydroxyphenyl)pentane,
3,3-bis-(4-hydroxyphenyl)-pentane,
2,2-bis-(4-hydroxyphenyl)heptane,
bis-(4-hydroxyphenyl)phenylmethane,
bis-(4-hydroxyphenyl)cyclohexylmethane,
1,2-bis-(4-hydroxyphenyl)-1,2-bis-(phenyl)propane,
2,2-bis-(4-hydroxyphenyl)-1-phenyl-propane and the like;

di(hydroxyphenyl)sulfones such as bis-(4-hydroxyphenyl)-sulfone,
2,4'-dihydroxydiphenyl sulfone,
5'-chloro-2,4'-dihydroxydiphenyl sulfone,
5'-chloro-4,4'-dihydroxydiphenyl sulfone, and the like;

di(hydroxyphenyl)ethers such as bis-(4-hydroxyphenyl)-ether,
the 4,3'-, 4,2'-, 2,2'-, 2',3'-, dihydroxydiphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxydiphenyl)-ether,
4,4'-dihydroxy-2,6-dimethoxydiphenyl ether,
4,4'-dihydroxy-2,5-diethoxydiphenyl ether, and the like.

Also suitable are the bisphenol reaction products of 4-vinyl-cyclohexene and phenols, e.g., 1,3-bis-(p-hydroxyphenyl)-1-ethylcyclohexane, and the bisphenol reaction products of α-pinene or its isomers and phenols as well as bis-phenols such as 1,3,3-trimethyl-1-(4-hydroxyphenyl)-6-hydroxyindane, and 2,4 - bis(4 - hydroxyphenyl)-4-methylpentane, and the like.

Particularly desirable polymers result from those wherein Q has the formula

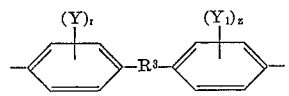

wherein Y and $Y_1$ are as previously defined $r$ and $z$ have values from 0 to 4 inclusive, and $R^3$ is a divalent saturated aliphatic hydrocarbon radical, particularly alkylene and alkylidene radicals having from 1 to 3 carbon atoms, and cycloalkylene radicals having up to and including 9 carbon atoms.

It is understood that wherever cis and trans geometrical isomers exist in the chemical structures discussed in this invention, that both are included unless specified to the contrary.

TETRAHALOBUTANE-1,4-DIOL POLYESTERS

The polyesters of this invention are conveniently prepared by the interaction of a dicarboxylic acid chloride with a halogenated diol. Thus for example, 1,4-cis-cyclohexanedicarbonyl chloride and 2,2,3,3-tetrachlorobutane-1,4-diol afford a polyester represented by the structure

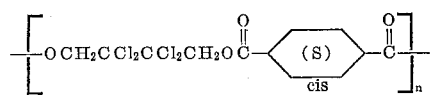

wherein $n$ is an integer sufficiently high that it affords normally solid polymers.

While the synthesis of the polyester can be effected either in the presence or absence of a solvent, the use of a solvent affords better temperature control and precludes local overheating. Inert solvents boiling in the range of about 110 to 180° C. are preferred. Suitable solvents include aromatics such as toluene, ortho, para or meta xylene, chlorobenzene, o-dichlorobenzene and the like; aliphatics such as s-tetrachloroethane, trichloroethane (1, 1,2), and the like; and mixtures of o-dichlorobenzene and n-hexane or o-dichlorobenzene and n-heptane and the like.

Inasmuch as the polymerization reaction is conducted at the reflux temperature of the solvent, the polymerization reaction temperature is about 110 to 180° C.

Atmospheric pressure is preferred although not critical so that superatmospheric and subatmospheric pressures can be used if desired.

No catalysts are needed to effect this polymerization process.

It is preferred to employ equivalent amounts of acid chloride and diol but either reactant can be used up to an excess of 50 mole percent of the other particularly where the obtention of high molecular weight polyesters is not important.

The polyester product can be isolated either by evaporation of the reaction solvent or by coagulation of the polymer from its solution in a miscible precipitating solvent. Examples of suitable precipitating solvents are aliphatic alcohols, e.g., methanol, ethanol, or isopropanol and aliphatic ketones e.g., acetone, methyl ether ketone and the like.

Although it is not necessary, a stream of an inert gas is usually bubbled through the refluxing solution of reactants to facilitate removal of hydrogen halide formed as the sole by-product during the condensation-polymerization reaction. This practice also serves to provide an inert blanket or atmosphere thus obviating the chance of oxidative decomposition. Inert gases which can be used include nitrogen, helium, argon and the like.

No specialized equipment is required for the preparation of these halogenated polyesters other than that familiar to those skilled in the art of polymer chemistry. It will be apparent to such persons that this polyester synthesis may be carried out either as a batch or continuous process.

This synthesis is subject to several variations with respect to both the number and type of reactants and as to the nature of the functional groups on the reactants through which a condensation polymerization can be effected. Thus, for example, the invention is not limited to the copolymerization condensation of a single diacid chloride with a single diol. Mixed polyesters may be provided by interacting one or more diacid chlorides and diols. When an aromatic diol e.g., bisphenol-A 2,2-bis(p-hydroxyphenyl)propane, is used as a coreactant with a halogenated diol, it is preferred that a catalyst be utilized. For this purpose, magnesium metal or magnesium salts, e.g., magnesium chloride, sulfate, silicate, aluminosilicate, acetate and the like are particularly useful.

Another modification consists in carrying out the initially described solution interaction of a diacid chloride and halogenated diol in the presence of an inorganic base or tertiary organic base. Examples of the former are sodium hydroxide, potassium hydroxide, lithium hydroxide and the like. The latter base is illustrated by pyridine, N,N-dimethylaniline, triethylamine and the like.

The formation of halogenated polyester can also be effected by a melt process involving the transesterification with halogenated diol and a dibasic acid ester. The alcohol moiety of the dibasic acid ester can be either aliphatic, e.g., derived from methanol, ethanol, propanol, butanol and the like, or aromatic e.g., derived from phenol, p-cresol and the like. Basic catalysts are used in this procedure, examples of which include barium oxide, lead dioxide and manganese dioxide.

Mixtures of the dicarboxylic acid reactant can readily be utilized leading to the formation of novel mixed normally solid polyesters having the structure

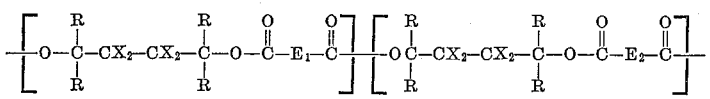

wherein X is halogen, each R is a hydrogen or a hydrocarbon group such as lower alkyl, cycloalkyl, aryl and alkaryl radicals and each of $E_1$ and $E_2$ is a hydrocarbon radical such as an alkylene, cycloalkylene or arylene radical.

Films prepared from the polymers of this invention are useful as a packaging medium because of their low permeability to such gases as oxygen, carbon dioxide and nitrogen. They are particularly useful for packaging dairy products, fresh meat, bread, crackers, cosmetics and medicaments. Acid resistant molded parts such as fittings, pipes, valves, pump impeller blades and the like which are exposed to corrosive acids can be fabricated from these polymers.

The invention is illustrated by the examples which follow. All parts and percentages are by weight unless otherwise specified.

*Example 1.—Preparation of polyester from 1,4-cis-cyclohexanedicarbonyl chloride and 2,2,3,3-tetrachlorobutane-1,4-diol*

Into a 125 ml., three-neck, round bottom flask fitted with a reflux condenser, thermometer and gas inlet tube was charged 2.28 g. (0.01 mole) of 2,2,3,3-tetrachlorobutane-1,4-diol, 2.09 g. (0.01 mole) of 1,4-cis-cyclohexanedicarbonyl chloride and 25 ml. of s-tetrachloroethane. A stream of dry argon was passed through the solution, maintained at reflux temperatures for 51 hours, from the gas inlet tube. The hydrogen chloride evolved during the reaction, was swept out of the flask by the argon. At the end of this time period, the reaction mixture which has become slightly brown and viscous was filtered through a Celite bed (diatomaceous earth filter aid) prepared in chloroform. The filtrate was added slowly with stirring to 250 ml. of isopropanol contained in a 500 ml. beaker. The cyclohexyltetrachlorobutane polyester thus coagulated as a white, fibrous polymer in a yield of 65% had a reduced viscosity (0.2 g. solution at 25° C. in 100 ml. of chloroform) of 0.52 and a chlorine content of 39.27% (calculated, 39.01%). The infrared spectrum of this polymer exhibits a strong absorption band at about 5.75 microns indicative of the ester linkage.

A film of this polyester cast from chloroform was crystalline (determined by X-ray diffraction) and displayed the following physical properties:

| | |
|---|---:|
| $T_g$ (glass transition temperature) _____° C__ | 50 |
| $T_m$ (melting point) _____° C__ | 150 |
| Tensile strength (ASTM D-882-56T) __p.s.i___ | 4,000 |
| Tensile modulus (ASTM D-882-56T) ___p.s.i__ | 185,000 |

The gas permeability of this polymer measured in cc. mil./100 in.² 24 hrs. atm. with nitrogen, oxygen, hydrogen and carbon dioxide was compared with bisphenol-A polycarbonate (Lexan) and a commercial vinylidene chloride-vinyl chloride copolymer (Saran). These data, presented in Table 1, demonstrate the low permeability of the polyester of this invention as being greatly superior to the Lexan with all four gases and comparable to Saran with three out of the four gases.

TABLE 1

| Film Substrate | Permeability, cc. mil./100 in.² 24 hrs. atm. | | | |
|---|---|---|---|---|
| | $N_2$ | $O_2$ | $H_2$ | $CO_2$ |
| Example 1 polyester_____ | 0.2 | 2.5 | 65.0 | 4.5 |
| Lexan (bisphenol-A polycarbonate)__ | 36.0 | 185.0 | 1,750.0 | 1,000.0 |
| Saran (vinylidene chloride-vinyl chloride copolymer)_____ | 0.2 | 1.3 | 6.0 | 2.0 |

Reduced viscosity values were obtained from the equation:

$$\text{Reduced viscosity} = \frac{t_s - t_o}{c \cdot t_o}$$

wherein:

$t_0$ is the efflux time of the pure solvent.
$t_s$ is the efflux time of the polymer solution.
$c$ is the concentration of the polymer solution expressed in terms of grams of polymer per 100 ml. of solution.

The thermoplastic polymers of this invention have reduced viscosity values in the range of 0.1 to 8.

Glass transition temperatures, commonly referred to as second order phase transition temperatures, refer to the inflection temperatures found by plotting the resilience (recovery from 1 percent elongation) of a film ranging in thickness from 3–15 mils against the temperature. A detailed explanation for determining resilience and inflection temperature is to be found in an article by Alexander Brown in "Textile Research Journal" volume 25, 1955, at page 891.

The gas permeability data were obtained according to ASTM D–1434–58.

*Example 2.—Preparation of polyester from isophthaloyl chloride and 2,2,3,3-tetrachlorobutane-1,4-diol*

The equipment and procedure described in Example 1 was employed with 2.03 g. (0.01 mole) of isophthaloyl chloride and 2.28 g. (0.01 mole) of 2,2,3,3-tetrachlorobutane-1,4-diol in 25 ml. of s-tetrachloroethane. The highly crystalling (>50% by X-ray diffraction) polymer thus obtained had a melting point of 272–277° C. and a reduced viscosity (0.2 g. solution in 100 ml. of α-chloronaphthalene at 175° C.) of 0.1. The observed chlorine content of the polymer, 39.74% compared favorably with the theoretical figure, 39.61%, for the structure asserted. This polymer was remarkably resistant to attack by concentrated sulfuric acid. A sample stirred in a beaker of concentrated sulfuric acid at 25° C. was unaffected after twenty-four hours.

*Example 3.—Polyester prepared from a mixture of isophthaloyl and cis-1,4-cyclohexane dicarbonyl chlorides with 2,2,3,3-tetrachlorobutane-1,4-diol*

The equipment and procedure described in Example 1 was employed with a mixture of 1.015 g. (0.005 mole) of isophthaloyl chloride and 1.045 g. (0.005 moles) of cis-1,4-cyclohexanedicarbonyl chloride and 2.28 g. (0.01 mole) of 2,2,3,3-tetrachlorobutane-1,4-diol in 25 ml. of s-tetrachloroethane. The polymer obtained in a yield of 65% had a reduced viscosity (0.2 g. solution in 100 ml. of chloroform at 25° C.) of 0.20. The observed percent chlorine was 39.60; calculated 39.28%.

*Example 4.—Polyester from terephthaloyl chloride and 1,4-dimethyl-2,2,3,3-tetrachlorobutane-1,4-diol*

Using the equipment and procedure of Example 1 with 2.03 g. (0.01 mole) of terephthaloyl chloride and 2.56 g. (0.01 mole) of 1,4-dimethyl-2,2,3,3-tetrachloro-butane-1,4-diol leads to a polyester similar in physical properties to those described above.

desired, such as the dibromo-, difluoro- or diiodoformates.

The metal catalyst suitably employed comprises the phenolic salt of a metal selected from the group consisting of beryllium, magnesium, calcium, strontium, barium and manganese. These phenates are readily prepared by reacting all of the phenols described heretofore with either the free metal or with an inorganic salt thereof such as the metal chloride, bromide, iodide, sulfate, nitrate, phosphate or silicate. In practice, however, it is convenient to form the phenate catalyst in situ by adding to the reaction system the free metal or metal salt. Catalyst concentrations are not narrowly critical, but in general, from about 50 to about 5000 millimoles of metal or metal compound per mole of bisphenol reactant provide adequate catalytic action. Preferably from about 50 to about 500 millimoles of catalyst per mole of bisphenol is employed.

Temperatures of from about 100° C. to about 220° C. provide a generally useful range for normal operation with about 140° C. to about 185° C. being preferred. The temperature is determined by the boiling point of the solvent used since running the reaction at solvent reflux temperatures facilitates the removal of the by-product, hydrogen chloride. The solvents described previously for the preparation of the polyesters of this invention are suitable for the preparation of the polycarbonates as well.

While atmospheric pressures are preferred for economic reasons, superatmospheric and subatmospheric pressures can be utilized, if desired.

The use of equimolar amounts of tetrahalobutane-1,4-diol dihaloformates and bisphenol leads to the highest molecular weight polycarbonates and is thus preferred. However, excesses of up to about 20 mole percent of either reactant over the other can also be employed.

The use of a stream of an inert gas passed through the reactants during the polymerization process is advantageous in removing the hydrogen chloride formed but is not necessary. Suitable gases include carbon dioxide, nitrogen, helium, argon and the like.

The polycarbonate product can be isolated by either evaporating the solvent or by coagulation in a miscible, precipitating solvent.

While the interfacial polycondensation technique with aqueous sodium hydroxide can also be used for the preparation of the polycarbonates of this invention, lower molecular weight products usually result due to the ease of hydrolysis of the tetrahalobutane-1,4-diol dihaloformates. This tendency to hydrolyze is further enhanced by the presence of the four strongly electronegative chlorine atoms. However, for many uses the resultant polycarbonate is of sufficient molecular weight for practical purposes.

The formation of tetrahalobutane-1,4-diol polycarbonates is represented graphically with the dichloroformate of tetrachlorobutane-1,4-diol and bisphenol-A, 2,2-bis-(4-hydroxyphenyl)propane.

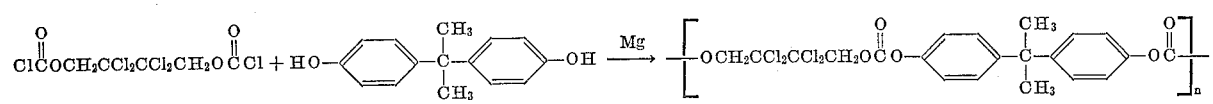

TETRAHALOBUTANE-1,4-POLYCARBONATES

The preferred process for the preparation of tetrahalobutane-1,4-diol polycarbonates comprises heating at elevated temperatures an anhydrous reaction system which comprises a tetrahalobutane-1,4-diol dichloroformate, a catalytic amount of a non-amphoteric metal catalyst and a bisphenol. Other dihaloformates can also be used, if desired, such as the dibromo-, difluoro- or diiodoformates.

wherein $n$ is an integer having a value sufficiently high to afford a solid polymer.

Preferred bisphenols include 2,2-bis-(4-hydroxyphenyl)propane, bis-(4-hydroxyphenyl)sulfone, 1,3-bis(p-hydroxyphenyl)-1-ethylcyclohexane, the bisphenol reaction products of α-pinene or its isomers with phenol as well an halogen substituted analogs of these bisphenols. Three products arise from the reaction of phenol with α-pinene, identified hereinafter as α-bisphenol, β-bisphenol and γ-bisphenol, having the structures shown below:

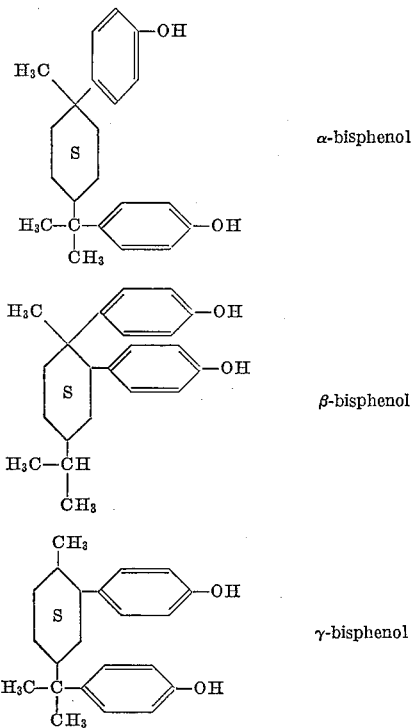

The list of bisphenols given previously can also be employed for preparing these polycarbonates.

The following examples illustrate the preparation of tetrahalobutane-1,4-diol polycarbonates with all parts and percentages given by weight unless otherwise specified.

*Example 5.—Polycarbonate from 2,2,3,3-tetrachloro-1,4-butanediol and bisphenol-A*

A mixture of 1.765 g. (0.005 mole) of 2,2,3,3-tetrachloro-1,4-butanediol dichloroformate, 1.14 g. (0.005 mole) of bisphenol-A, 15 ml. of o-dichlorobenzene and 0.06 g. (50 mole percent) of magnesium powder was heated at reflux for 15 hours in a 100 ml., 3-neck, round-bottom flask equipped with a reflux condenser, stirrer, thermometer and gas inlet tube. During this period of 15 hours a dry stream of argon was bubbled through the solution to assist in removing the evolved hydrogen chloride. The viscous solution which remained was filtered through a bed a Celite (diatomaceous earth filter aid) prepared in chloroform. The bed after filtration was washed with 50 ml. of chloroform and the combined filtrate and washing added slowly with stirring to a beaker containing 500 ml. of isopropanol. The white, fibrous polycarbonate of tetrachlorobutane-1,4-diol which thus coagulated had a reduced viscosity of 1.12 (0.2 g. in 100 ml. of chloroform at 25° C.). This polymer showed a strong carbonyl infrared absorption bond at about 5.65 microns, a chlorine content of 28.15% (theoretical is 27.95%) and a crystallinity by X-ray diffraction of about 20%. A film of this polymer cast from chloroform showed the following physical properties:

| | |
|---|---|
| Glass transition temperature °C__ | 90–110 |
| Melting point °C__ | 175 |
| Tensile strength (ASTM D–882–56T) __p.s.i__ | 6,000 |
| Tensile modulus (ASTM D–882–56T) __p.s.i__ | 350,000 |
| Elongation (ASTM D–882–56T) ____percent__ | 2–3 |

Unlike currently available commercial polycarbonates this 2,2,3,3-tetrachlorobutane-1,4-diol polycarbonate can be easily plasticized with various conventional plasticizers as e.g., phosphate esters such as tricresyl phosphate, cresyl diphenyl phosphate, octyldiphenyl phosphate and the like; phthalate esters such as benzyl cyclohexyl phthalate, butyl benzyl phthalate, cresyl benzyl phthalate, and the like; and epoxy stabilizers such as butyl epoxy stearate, epoxidized soy bean oil, epoxidized peanut oil and the like. Thus, for example, the addition of 30 weight percent of tricresyl phosphate to the above polycarbonate affords an elastomeric composition having excellent mechanical properties as shown below:

| | |
|---|---|
| Glass transition temperature °C__ | 15 |
| Melting point °C__ | 160 |
| Tensile strength (ASTM D–882–56T) ____p.s.i__ | 1,500 |
| Tensile modulus (ASTM D–882–56T) ____p.s.i__ | 35,000 |
| Elongation (ASTM D–882–56T) _____percent__ | 30–50 |

This plasticized polycarbonate exhibits the mechanical properties of a high softening polyvinyl chloride resin without the disadvantage of polyvinyl chloride resins viz., thermal instability. This unusual thermal property of even the unplasticized 2,2,3,3-tetrahalobutane-1,4-diol polycarbonate was demonstrated by its fabrication into films, forms and the like at temperatures of up to about 200° C. without any evidence of decomposition or thermal breakdown.

*Example 6.—Polycarbonate from 2,2,3,3-tetrachlorobutane-1,4-diol and 1,3-bis(p-hydroxyphenyl)-1-ethylcyclohexane*

A solution of 1.485 g. (0.005 mole) of 1,3-bis(p-hydroxyphenyl)-1-ethylcyclohexane, 0.5 g. of sodium hydroxide 20 ml. of water, 10 ml. of methylene chloride and 3 drops of triethylamine was placed in a 100 ml., 3-neck Morton flask equipped with a stirrer, reflux condenser and dropping funnel. While stirring vigorously a solution of 1.765 g. (0.005 mole) of 2,2,3,3-tetrachlorobutane-1,4-diol dichloroformate in 20 ml. of methylene chloride was added dropwise over a period of 13 minutes. The reaction mixture was stirred for an additional 10 minutes after which 3 drops of triethylamine was added followed by stirring for an additional 5 minutes. The aqueous layer was then decanted and the organic layer washed first with water, then with phosphoric acid and finally with water until neutral to litmus paper. Coagulation was effected by pouring this layer into 500 ml. of isopropanol. The resultant 60% yield of white polycarbonate of 1,3-bis(p-hydroxyphenyl)-1-ethylcyclohexane and 2,2,3,3-tetrachlorobutane-1,4-diol had a reduced viscosity of 0.28 (0.2 g. in 100 ml. of chloroform at 25° C.), a chlorine content of 25–68% (theoretical—24.61%) and showed a characteristic infrared carbonyl absorption band at 5.7 microns. A film of this polycarbonate cast from chloroform showed the following physical properties:

| | |
|---|---|
| Glass transition temperature °C__ | 135 |
| Tensile strength (ASTM D–882–56T) ___p.s.i__ | 6,000 |
| Tensile modulus (ASTM D–882–56T) ___p.s.i__ | 400,000 |

*Example 7.—Polycarbonate from 2,2,3,3-tetrachlorobutane-1,4-diol and a 60:40 mixture of β- and γ-bisphenol*

The procedure described in Example 6 was followed with 1.62 g. (0.005 mole) of the β-, and γ-bisphenol mixture and 1.765 g. (0.005 mole) of 2,2,3,3-tetrachlorobutane-1,4-diol dichloroformate. There was thus obtained a 66% yield of polycarbonate having a reduced viscosity of 0.38, a chlorine content of 24.6% (theoretical—23.51%) and an infrared absorption band at 5.65 microns characteristic of a carbonate carbonyl group. The physical properties of this polycarbonate were:

| | |
|---|---|
| Glass transition temperature °C__ | 150 |
| Tensile strength (ASTM D–882–56T) ___p.s.i__ | 6,000 |
| Tensile modulus (ASTM D–882–56T) ___p.s.i__ | 260,000 |
| Pendulum impact strength _____ft. lbs./in.$^3$__ | 20 |
| Elongation (ASTM D–882–56T) _____percent__ | 3 |

Pendulum impact was measured by ASTM D–256–56 modified as follows: A steel pendulum was used, cylindrical in shape with a diameter of 0.95 inch and weighing 1.562 pounds. The striking piece, mounted almost at the top of the pendulum was a cylinder 0.3 inch in diameter. Film specimens 1.5 inches long, 0.125 inch wide and about 0.01 inch thick were clamped between the jaws of the tester so that the jaws were spaced 1 inch apart. The 0.125 inch width of the film was mounted vertically. The pendulum was raised to a constant height to deliver 1.13 foot pounds at the specimen. When the pendulum was released the cylindrical striking piece hit the specimen with its flat end, broke the film, and traveled to a measured height beyond. The difference between the height traveled with no film present and the height traveled with film present was converted to energy in foot-pounds. On dividing this value by the volume of that portion of the sample located between the jaws of the tester, the tensile impact strength in foot-pounds per cubic inch was obtained.

TETRAHALOBUTANE-1,4-DIOL POLYURETHANES

The preferred process for the preparation of tetrahalobutane-1,4-diol polyurethanes is similar to that already described for the polycarbonates with a secondary diamine such as piperazine or substituted isomeric piperazines being reacted instead of a bisphenol with the halogenated butane-1,4-diol dichloroformate.

The synthesis of tetrahalobutane-1,4-diol polyurethanes is demonstrated graphically below by the reaction of 2,2,3,3-tetrachlorobutane - 1,4-diol dichloroformate with trans-2,5-dimethylpiperazine:

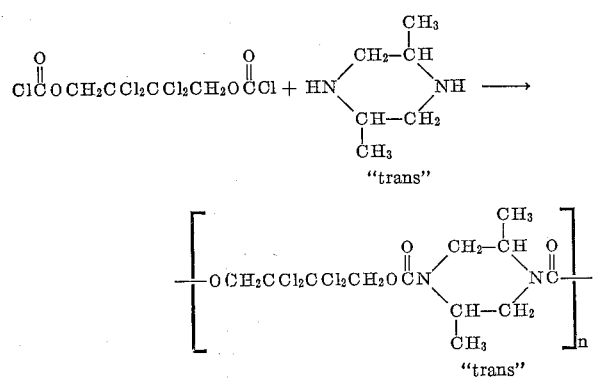

wherein $n$ is an integer having a value sufficiently high to afford a solid polymer.

The preparation of polyurethanes of tetrahalobutane-1,4-diols is illustrated by the following example. All parts given are by weight unless otherwise specified.

*Example 8.—Polyurethane from 2,2,3,3-tetrachlorobutane-1,4-diol and trans-2,5-dimethylpiperazine*

A mixture of 0.57 g. (0.005 mole) of trans-2,5-dimethylpiperazine, 1.765 g. (0.005 mole) of 2,2,3,3-tetrachlorobutane-1,4-diol dichloroformate, 25 ml. of s-tetrachloroethane, and 0.06 g. of magnesium powder was refluxed in a 3-neck, round-bottom flask equipped with a stirrer, reflux condenser and gas inlet tube. A stream of dry argon was bubbled through the refluxing mixture for 22 hours. The viscous solution was filtered through a Celite bed (made in $CHCl_3$) and the filtrate was coagulated in 500 ml. of isopropanol affording a white, fibrous polyurethane in a yield of 76%. The polymer had a reduced viscosity of 1.04 (0.2 g. in 100 ml. of chloroform at 25° C.), an infrared absorption band at 5.9 microns, indicative of a urethane group, a chlorine content of 36.83% (theoretical—36.04%) and a nitrogen content of 7.24% (theoretical—7.1%). A film of this polyurethane had the following properties:

| | |
|---|---|
| Glass transition temperature ° C | 90 |
| Melting point ° C | 240 |
| Tensile strength (ASTM D-882-56T) p.s.i. | 4,000 |
| Tensile modulus (ASTM D-882-56T) p.s.i. | 310,000 |

This polyurethane was about 20 to 30% crystalline as determined by X-ray diffraction and was self-extinguishing.

The self-extinguishing properties of the polycarbonates and polyurethanes of this invention were clearly demonstrated by placing films about 5 to 10 mils thick in a bunsen flame until the polymer ignited and then removing the bunsen flame. In all cases tested, the flame of the burning polymer immediately was extinguished when withdrawn from the bunsen flame. This procedure with thin polymer films is a more rigorous demonstration of self-extinguishing properties than the ASTM D-568-56T, test which calls for thicker specimens about 50 mils thick.

Although the invention has been described with a certain degree of particularity, it is understood that the present disclosure of the preferred forms has been made only by way of example, and that numerous changes may be resorted to without departing from the spirit and scope of the invention.

What is claimed is:
1. An essentially linear, normally solid, chlorinated polycarbonate having the structure

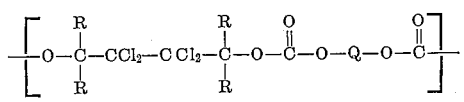

wherein each R is a monovalent radical selected from the class consisting of hydrogen and lower hydrocarbon groups and Q is a radical residuum of a dihydric phenol.
2. The polycarbonate claimed in claim 1 wherein Q is an arylene radical.
3. The polycarbonate claimed in claim 1 wherein Q is a bis-(p-hydroxyphenyl)alkane residue.
4. The polycarbonate claimed in claim 1 wherein Q is 2,2-bis(p-hydroxyphenyl)propane residue.
5. The polycarbonate claimed in claim 4 containing an effective amount of plasticizers.
6. The process of preparing an essentially linear, normally solid, halogenated polycarbonate having the structure

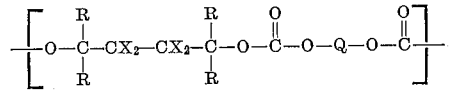

wherein each R is a monovalent radical selected from one of the class consisting of hydrogen and lower hydrocarbon groups, X is halogen and Q is a radical residuum of a dihydric phenol, which comprises contacting a substantially pure tetrahalobutane-1,4-diol dihaloformate with a dihydric phenol in the presence of a catalytic amount of a non-amphoteric metal catalyst selected from the group consisting of beryllium, magnesium, calcium, strontium, barium and manganese catalysts under substantially anhydrous conditions.
7. The process claimed in claim 6 wherein the non-amphoteric metal catalyst is magnesium.

References Cited

UNITED STATES PATENTS

| | | | |
|---|---|---|---|
| 2,902,473 | 9/1959 | Smith | 260—75 |
| 2,937,161 | 5/1960 | Ellingboe | 260—77.5 |
| 2,987,494 | 6/1961 | Black | 260—77.5 |
| 3,016,360 | 1/1962 | Schweiker et al. | 260—75 |
| 3,044,988 | 7/1962 | Ottmann | 260—75 |
| 3,046,255 | 7/1962 | Strain et al. | 260—47 |
| 3,220,978 | 11/1965 | Jaquiss | 260—47 |

OTHER REFERENCES

Hoga: Chemical Abstracts, vol. 54 (1960), col. 299f.

SAMUEL H. BLECH, *Primary Examiner.*